Figure 1:
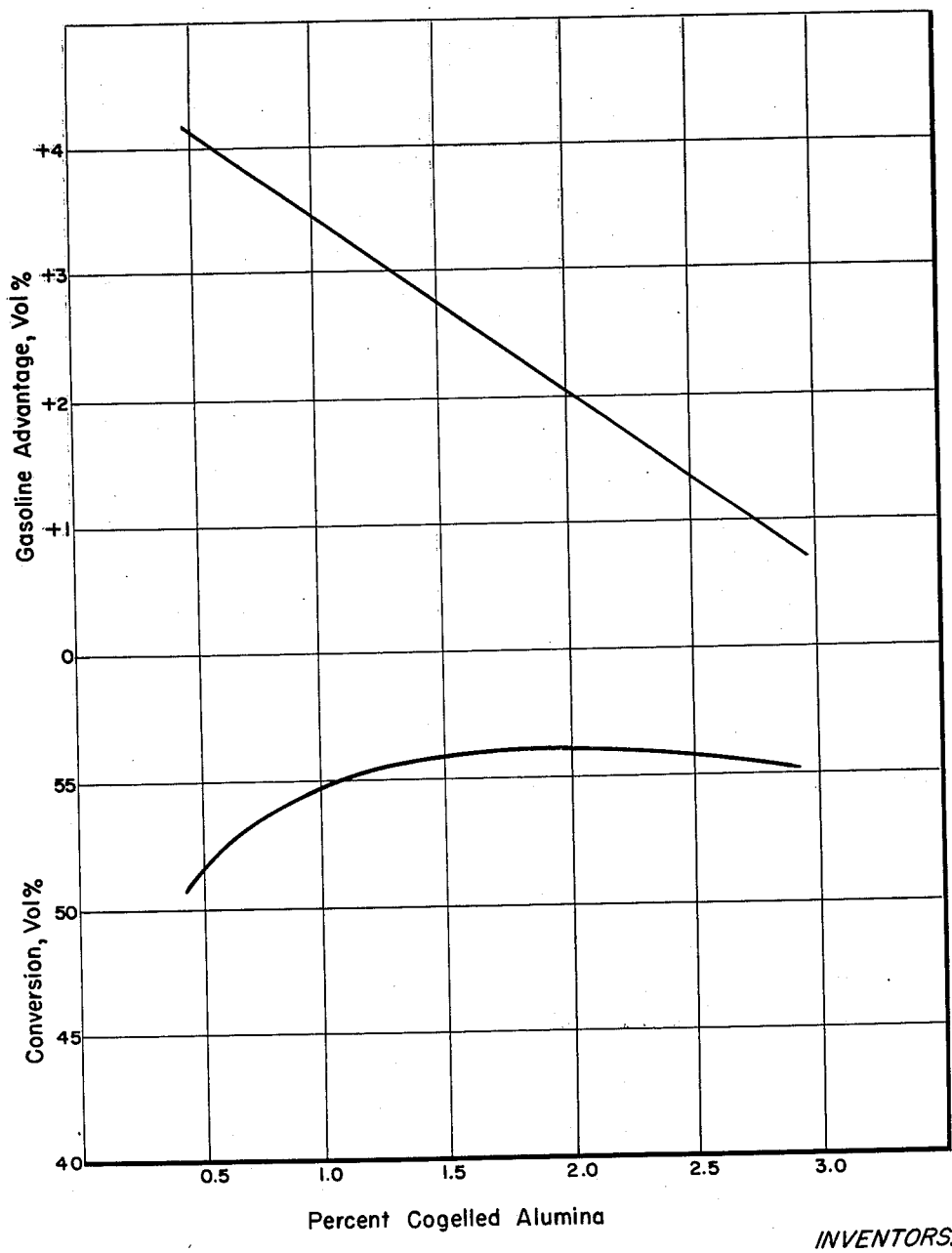

INVENTORS:
Charles J. Plank
Edward J. Rosinski by Raymond W. Barclay

ATTORNEY

United States Patent Office 3,120,496
Patented Feb. 4, 1964

3,120,496
SELECTIVE CRACKING CATALYST
Charles J. Plank, Woodbury, and Edward J. Rosinski, Almonesson, N.J., assignors to Socony Mobil Oil Company, Inc., a corporation of New York
Filed Mar. 23, 1960, Ser. No. 17,016
8 Claims. (Cl. 252—455)

This invention relates to an improved silica-alumina cracking catalyst characterized by unusual ability to selectively crack high molecular weight hydrocarbon oils to lighter material boiling in the range of gasoline. In one embodiment, the present invention is concerned with a catalytic composite of silica and alumina wherein interaction between the above components is controlled to achieve a highly selective catalyst. In another embodiment, the invention is directed to a method for producing such catalyst.

Various processes relating to the preparation of siliceous cracking catalysts have been described in the literature. Major effort has been directed to the manufacture of silica-alumina cracking catalysts. Generally, these catalysts have been prepared by activation of naturally occurring silica and alumina-containing clays or by synthetic formulation of composites of silica and alumina. Manufacture of synthetic catalysts has been directed to preparation of composites of silica and alumina to obtain maximum interaction of the alumina with the silica. Such purpose has generally been accomplished by reaction of alumina-producing solutions and silica-producing solutions together under conditions to achieve the formation of an intimate cogelled admixture of silica and alumina.

In accordance with the present invention, there has been discovered an improved silica-alumina cracking catalyst wherein interaction between the silica and alumina components is controlled. Control is directed, in contradistinction to previous methods for preparing synthetic silica-alumina cracking catalysts, to minimize the content of cogelled alumina. The enhanced selectivity of the catalyst is dependent on deriving major catalytic activity from silica-alumina created by the interaction of silica with alumina at a multitude of particle interfaces. Thus, the major and more selective catalytic component of the present catalyst resides at the surface of finely divided alumina-containing particles.

The present invention is concerned, in one aspect, with a method for preparation of a catalyst consisting essentially of silica and alumina by dispersing in a silica sol, an amount, corresponding to between about 5 and about 40 percent by weight of the resulting dry composite, of a finely divided porous material characterized by a surface area of at least 25 square meters per gram, selected from alumina and composites of silica and alumina containing at least about 40 weight percent alumina, which material has a weight mean particle diameter of between 1 and 5 microns, the concentrations and proportions of reactants being such that the resulting silica sol having the aforementioned finely divided material dispersed therein has a pH of between 6 and 11 and an alumina content, corresponding to cogelled alumina, as hereinafter defined, in the resulting dry composite, of less than about 1.5 weight percent, permitting the resulting sol to set to a hydrogel, treating the resulting hydrogel at a temperature between about 150° F. and about 220° F. with a dilute aqueous solution of an acid or acid salt for a period within the approximate range of ½ to 24 hours when an acid solution is employed and for a period within the approximate range of 8 to 48 hours when an acid salt is employed, washing the hydrogel free of water-soluble matter, drying and calcining.

In another embodiment, the present invention is directed to a method for preparing the above catalyst in the form of spheroids.

In still another embodiment, the invention described herein, is concerned with the selective silica-alumina cracking catalyst obtained in accordance with the foregoing process.

Thus, pursuant to the teachings of this invention, it has been discovered that a silica-alumina catalytic composite having unusual selective cracking ability may be prepared by incorporating in a silica sol a quantity of solid powdered alumina or silica-alumina composite, containing at least about 40 weight percent alumina, having a weight mean particle diameter of between 1 and 5 microns. The amount of such powdered material so introduced is generally between about 5 and about 40 percent by weight and preferably between about 10 and about 30 percent by weight of the resulting dry product. The concentrations and proportions of reactants are such that the resulting silica sol having the above powdered material dispersed therein has a pH of between 6 and 11 and an alumina content corresponding to cogelled alumina in the resulting dry product, of less than 1.5 weight percent. It has been found that the hydrogel product resulting from the setting of a silica sol containing powdered material of the aforementioned composition and particle diameter upon being subjected to specified acidic activation treatment and thereafter water-washed free of soluble matter, dried and calcined at a temperature below the fusion point of the powdered material afforded a silica-alumina cracking catalyst having unusual ability to selectively crack high molecular weight hydrocarbon oils to lighter materials boiling in the range of gasoline.

It is a critical feature of the invention that the cogelled alumina content, as hereinafter defined, of the ultimate catalyst be less than about 1.5 percent by weight. The amount of completely interacted or cogelled alumina is designated herein as that portion of alumina which is insoluble in a 67 weight percent aqueous solution of sulfuric acid at a temperature of 245–248° F. when treated for a period of 24 hours. In contradistinction to the present catalyst, conventional commercial synthetic silica-alumina cracking catalysts contain 3 to 5 weight percent of completely combined, i.e., insoluble, alumina determined under the above conditions.

FIGURE 1 of the attached drawing depicts graphically the relationship between the amount of cogelled (insoluble) alumina contained in the final catalyst composition and the advantage in yield of gasoline over a conventional silica-alumina cracking catalyst having a cogelled alumina content, as defined hereinabove, of about 3 weight percent. Referring more particularly to this figure, it will be seen that a marked advantage in gasoline yield was achieved with the catalyst of the invention, characterized by a cogelled alumina content of less than about 1.5 weight percent, as compared with a conventional silica-alumina cracking catalyst having a cogelled alumina content of about 3 percent by weight. Taking into consideration volume percent conversion to gasoline, it is evident that maximum overall improvement was realized with a catalyst having a cogelled alumina content, as specified above, of between about 0.5 and about 1.5 weight percent.

The particular physical form of the gel product will be determined principally by the use to which it is to be subjected. The process described herein may be employed in preparation of the gel in any desired physical form. Thus, the hydrosol containing added powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also, the hydrosol may be introduced into the perforations of a perforated plate and retained therein until the sol has set to a hydrogel, after which the formed hydrogel pieces are removed from the plate. The method of the invention is especially useful as applied to the manufacture of spherically shaped gel particles produced by introducing drops of hydrosol into a water-immiscible liquid wherein the hydrosol sets to spheroidal bead-like particles of hydrogel. Larger size spheres are ordinarily within the range of from about 1/64 to about 1/4 inch in diameter, whereas smaller size spheres, which are generally referred to as microspheres are within the ranges of from about 10 to about 100 microns in diameter. The use of spherically shaped gel particles is of particular advantage as catalysts in hydrocarbon conversion processes, including the moving catalyst bed process, the fluidized process, etc. in which the spheroidal gel particles are subjected to continuous movement. As applied to the stationary bed, spheroidal gel catalyst particles provide effective contact between the reactants and the catalyst by avoiding channeling.

It is accordingly a preferred embodiment of the present invention to prepare the described gel catalyst product in the form of spheres although it is to be realized that the method hereinafter set forth may also be employed in obtaining a mass of gel which may thereafter be broken up into particles of desired size. Likewise, the method described herein may be used for the preparation of silica gels containing dispersed alumina in the form of particles of any other desired size or shape.

A silica hydrosol is prepared, in accordance with the method described herein, containing between about 5 and about 40 percent by weight of a powdered porous material having a weight mean particle diameter of 1 to 5 microns and a surface area of at least 25 m.$^2$/g. and consisting of alumina or a silica-alumina composite having an alumina content of at least about 40 weight percent. The above particle size is an essential factor in affording a suitable catalyst product. The powdered material may be added by dispersing in an already prepared silica hydrosol or, as is preferable where the hydrosol is characterized by a short time of gelation, the powder may be added to one or more of the reactants used in forming the hydrosol or may be admixed in the form of a separate stream with streams of the hydrosol-forming reactants in a mixing nozzle or other means where the reactants are brought into intimate contact. The powder may also be introduced into the hydrosol by the formation in situ of a finely divided alumina precipitate in one or more of the reactant streams by contacting appropriate chemicals either dissolved in reactant streams or in separate streams. Likewise, an alumina-containing powder may be introduced in an already prepared hydrosol by dispersing therein materials which will form a finely divided precipitate. The latter methods in which a precipitate is formed in the hydrosol or in reactants used in preparation thereof have generally not been found to be as desirable as the addition of alumina-containing powder which has been previously ground to the requisite particle size and thereafter introduced into the hydrosol or during the course of hydrosol formation since, as noted hereinabove, close control of the particle size of the added aluminous material in the range of 1 to 5 microns is essential to the success of the present process. As a general rule, it has been found that the particle size of the added aluminous material may be controlled with greater accuracy by grinding than by precipitation, although it is to be understood that the present process contemplates the incorporation of the described powdered material in a silica hydrosol employing any of the foregoing or other feasible techniques.

It is, however, preferred following the teachings of this invention to disperse the fine aluminous particles in the acid solution and to subsequently admix such solution with the silicate reactant solution. Under such conditions, the reaction time between the fine particles and acid solution is maintained at a minimum, i.e., less than one hour, to prevent excessive solution of the fine aluminous particles which would lead to the formation of undesired cogelled silica-alumina component. Without being limited by any theory, it would appear that when contact between the finely divided aluminous particles and acid solution takes place, some reaction occurs resulting in the formation of reactive alumina interfaces on the particles. Such interfaces react with the silica component during gelation. Subsequent treatment of the hydrogel with acidic solution under the conditions noted hereinabove serve to create silica-alumina sites on the surfaces of the aluminous particles. The particular type of silica-alumina site, so formed, appears to be active, stable and more selective than the silica-alumina catalytic site formed by cogellation in accordance with conventional preparation.

The silica hydrosol initially formed in the present process may be produced by well known methods of reaction between an acid and a silicate. The acid employed may be any of those heretofore utilized in preparation of silica hydrosols such as, for example, sulfuric, hydrochloric, nitric, acetic, phosphoric, etc. Of these, the mineral acids are preferred. Particular preference is accorded sulfuric acid. The silicate reactant may be an organic silicate, such as ethyl ortho silicate or an inorganic alkali metal silicate. The alkali metal silicate reactant used in the preparation of the present catalysts is generally sodium silicate but it is contemplated that other alkali metal silicates such as potassium silicate may, likewise, be used.

The alumina-containing powder employed may be any porous alumina having a surface area in excess of 25 square meters per gram and preferably greater than 50 square meters per gram. Alumina in various phases or mixtures of phases may be employed. Thus, alpha alumina, gamma alumina, chi alumina, bauxite in anhydrous or various hydrated forms may be utilized. Highly calcined forms of alumina which are substantially devoid of porous structure and do not possess the requisite above minimum surface area are not satisfactory for use in the present process. The alumina-containing powder may also be a composite of alumina with silica such as in naturally occurring deposits of clay, kaolin, minerals, etc. or synthetic composites of silica and alumina including, for example, cogelled or coprecipitated silica and alumina. Also composites of silica impregnated with alumina or alumina impregnated with silica may be used. The alumina content of such composites should be appreciable and, in general, at least 40 weight percent.

The particle size distribution of the aluminous powder introduced into the silica hydrosol in accordance with the present process was determined by sedimentation methods. The weight mean particle diameters were determined by plotting the cumulative percent of alumina-containing powder smaller than a given diameter against particle diameter, dividing the total size range into a number of small fractions and calculating as follows:

$$\text{Weight mean diameter} = \frac{\sum d_i q_i}{\sum g_i}$$

wherein $d_i$ is the mean particle size of the fraction in microns and $g_i$ is the corresponding weight percent material in the fraction.

In addition to having the above-noted particle size, the aluminous powder incorporated in the silica hydrosol should necessarily be only slightly soluble therein and should further be characterized by being infusible at the hydrogel drying and calcining temperatures. The form of hydrogel is necessarily maintained substantially constant from a time prior to gelation until after the gel has been dried. During drying, the hydrogel undergoes considerable shrinkage. The drying is carried to a stage beyond that at which maximum shrinkage of the gel is obtained. The gel, after syneresis or shrinkage thereof has been completed, is substantially dry, that is, the gel possesses open pores free of liquid although it still contains a relatively small percentage of water which is evolved upon subjecting the gel to a relatively high temperature. Hydrogel containing powdered alumina-containing powder dispersed therein prepared as in the present process may be dried at room temperatures or at higher temperatures in air or steam as well as in various inert or reducing atmospheres. While the prepared hydrogel may be dried at ambient temperature by merely exposing to the air, it is preferred to accelerate the removal of liquid content from the hydrogel by drying at a temperature in the range of about 150° F. to about 400° F. until shrinkage of the hydrogel is substantially complete. Drying may be carried out in air or superheated steam. Calcination of the dried gel may be effected in an inert gas, air, steam or mixtures thereof at a temperature below that at which sintering is encountered and generally in the approximate range of 1150° F. to 1400° F. for a period of about 1 hour or more, generally from about 1 hour to about 24 hours.

The silica hydrosol containing finely divided dispersed alumina-containing powder is characterized by a pH within the approximate range of 6 to 11 and more particularly within the range of 7 to 9.5. The latter pH range has been found to be especially applicable when the hydrosol is formed into spheroidal hydrogel particles in accordance with techniques described hereinabove.

The resulting silica hydrogel having finely divided alumina-containing powder dispersed therein is, in accordance with the method of the invention, subjected to treatment with an acidic solution having a pH less than about 5 at a temperature between about 150 and about 220° F. for a period extending from ½ hour to 48 hours, depending on the nature and concentration of the acidic treating solution. Thus, it is preferred to utilize a dilute aqueous treating solution containing less than about 10 percent by weight of the acidic compound. Both acids and acid salts may be employed as the acidic compound. More particularly, it has been found that when an acid solution is employed, the period of treatment should be within the approximate range of ½ to 24 hours and when an acid salt solution is employed the period of treatment should extend from 8 to 48 hours. While any acid or acid salt which does not adversely affect the catalytic properties of the resulting product may apparently be employed, a mineral acid and particularly, sulfuric acid is preferred among the acids and ammonium and aluminum acid salts are preferred among the acid salts.

The hydrogel after acid treatment may optionally be base-exchanged with a suitable aqueous solution containing an ion capable of replacing any remaining zeolitic alkali metal, which ion does not detrimentally affect the finished catalyst. Generally, it has been found that subsequent base-exchange after the acid treatment is unnecessary since zeolitic alkali metal contained in the hydrogel before the acid treating step is, under the conditions of such treatment, noted hereinabove substantially or entirely removed during the acid treating step.

The hydrogel after acid treatment or after base-exchange, if such step is employed, is water washed free of soluble matter. The washed hydrogel is then dried, suitably in an atmosphere of superheated steam, at a temperature of about 150° F. to about 400° F. The dried product is thereafter calcined suitably in an atmosphere of air and/or steam, at a temperature of 1150° F. to 1400° F. to yield the finished catalyst.

Catalytic hydrocarbon conversion, utilizing the catalyst described herein may be carried out at catalytic cracking conditions employing a temperature within the approximate range of 700° F. to 1200° F. and under a pressure ranging from sub-atmospheric up to several hundred atmospheres. The contact time of the oil with the catalyst is adjusted in any case according to the conditions, the particular oil feed and the particular results desired to give a substantial amount of cracking to lower boiling products.

The cracking activity of the catalyst is a measure of its capacity to catalyze conversion of hydrocarbons and is expressed herein as the percent conversion of a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations.

Cracking activity of the catalyst of the present invention and a comparable control catalyst consisting of a commercial silica-alumina cracking catalyst containing about 10 weight percent total alumina content and about 90 weight percent silica were determined in accordance with the following examples which will serve to illustrate the catalyst and method of the invention without limiting the same:

*Example 1*

Alpha alumina trihydrate ($\alpha$ $Al_2O_3 \cdot 3H_2O$) was milled in sufficient water to form a 20 percent by weight aqueous slurry of alumina for 72 hours at room temperature (70–80° F.). The resulting slurry contained finely divided alumina having a weight mean particle diameter of 1.46 microns. A quantity of such slurry was dispersed in a solution of sulfuric acid as follows:

A. Acid-alumina fines solution
   (1) 4.42 lbs. of 96.7% $H_2SO_4$
      20.6 lbs. of $H_2O$
   (2) 17.59 lbs. aqueous slurry $\alpha$ $Al_2O_3 \cdot 3H_2O$ containing 20% wt. $Al_2O_3$
      11.79 lbs. $H_2O$ Solution 2 was added slowly to solution 1 while agitating vigorously to prevent agglomeration of the fines. The final solution A had a specific gravity of 1.121 at 68° F.

Solution A above was mixed with an aqueous sodium silicate solution having a specific gravity of 1.206 at 81° F. and characterized by the following composition:

B. Silicate solution:
   33 lbs. of N-Brand sodium silicate containing 28.85 wt. per cent $SiO_2$
   22 lbs. of $H_2O$ Four hundred (400) cc./min. of the silicate solution were contacted with 392 cc./min. of the acid-fines solution in a mixing nozzle, forming a hydrosol having a pH of 8.5.

The resulting hydrosol was introduced in the form of globules into a water-immiscible oil medium wherein the globules set to hydrogel beads in 2.0 seconds at a hydrosol temperature of 59° F.

After formation the hydrogel beads were water-rinsed free of oil and covered with a 2 weight percent aqueous sulfuric acid solution (½ volume of acid solution/volume hydrogel). The hydrogel was then heat treated in the acid solution at 200° F. for 2 hours, reducing the hydrogel pH from 8.5 to 3.6. The acid-treated hydrogel was then base-exchanged with 3 two-hour and one overnight (20 hours) change with 2 percent by weight aqueous ammonium chloride solution. The base-exchanged product was water-washed free of chloride and sulfate ions, air dried at 270° F. for 20 hours, calcined in air for 10 hours at 1200° F. and stabilized with a 20 hour steam treat at 1225° F. with steam at atmospheric pressure.

The resulting catalyst was characterized by a surface area of 203 m.²/g., an alumina content of 23.0 weight percent, a sodium content of 0.08 weight percent, a sulfate content of <0.09 weight percent and an apparent density of 0.65 g./cc.

The above catalyst was tested for catalytic cracking activity by passing thereover a charge of a Mid-Continent gas oil having a boiling range of 450 to 950° F. at a reactor temperature of 875° F., a LHSV of 1.5 at atmospheric pressure. The results obtained presented in Table I hereinbelow show a conversion of 54.4 volume percent affording +3.3 volume percent more 10 RVP gasoline than standard silica-alumina catalyst at the same conversion. The excess C₄'s were lower by 1.6 volume percent. An advantage in dry gas of −1.2 weight percent and −0.7 weight percent coke were also realized.

EXAMPLE 2

The catalyst of this example was prepared in the same manner as in Example 1 except that the base-exchange step with ammonium chloride was eliminated to determine whether substantially all the base-exchange had occurred during the previous heat acid treating step.

Catalytic cracking evaluation of this catalyst was carried out under the same conditions as in Example 1. The results obtained are set forth in Table I hereinbelow and show a conversion of 51.6 volume percent affording a +3.5 volume percent more 10 RVP gasoline, −2.5 volume percent excess C₄'s, −1.4 dry gas and −0.2 weight percent coke over standard silica-alumina catalyst at the same conversion.

It will be evident from a comparison of the results obtained with the catalysts of Examples 1 and 2 that substantially complete base-exchange of the hydrogel had been accomplished during the hot acid treating step, making subsequent treatment with the ammonium chloride solution unnecessary.

EXAMPLE 3

The catalyst of this example was formed in the same manner as in Example 1. The hydrogel beads, after being washed free of forming oil, were covered with a 5 weight percent aqueous aluminum sulfate solution (½ volume of solution/volume hydrogel). The hydrogel was then heat treated in such solution at 200° F. for 4 hours reducing the hydrogel pH from 8.5 to 3.5. The treated hydrogel was then water-washed free of sulfate ions, dried in air at 270° F. for 20 hours, calcined in air at 1200° F. for 10 hours and stabilized by treating with steam at atmospheric pressure for 20 hours at 1225° F.

Catalytic cracking evaluation of this catalyst was carried out under the same conditions as in Example 1. The results obtained are presented in Table I hereinbelow and show that while this catalyst is active, giving a 51.6 volume percent conversion, it does not possess the selectivity advantage over the standard silica-alumina catalyst such as achieved with the catalysts of Examples 1 and 2.

The conditions of formation and the cracking evaluation results obtained for the above catalysts are set forth in the following table:

Table I

| Example No. | 1 | 2 | 3 |
| --- | --- | --- | --- |
| Description | Silica gel plus 25% Al₂O₃ as alpha Al₂O₃·3H₂O formed at 8.5 pH | | |
| Hydrogel Activation: | | | |
| Solution | H₂SO₄ | H₂SO₄ | (*) |
| Conc., percent Wt | 2 | 2 | 5 |
| Time, Hrs | 2 | 2 | 4 |
| Temp., ° F | 200 | 200 | 200 |
| Final Gel, pH | 3.6 | 3.0 | 3.5 |
| Base Exchange: | | | |
| Solution | NH₄Cl | None | None |
| Conc., percent Wt | 2 | | |
| No. Changes | 4 | | |
| Physical Properties: | | | |
| Apparent Dens., g./cc | 0.65 | 0.87 | 0.77 |
| Fresh | | | |
| Steamed ¹ | | | |
| Surface Area, m.²/g.— | | | |
| Fresh | 537 | 506 | 498 |
| Steamed ¹ | 203 | 175 | 180 |
| Analysis: | | | |
| Na, percent Wt | 0.08 | 0.43 | 0.29 |
| SO₄, percent Wt | <0.09 | <0.09 | <0.09 |
| Al₂O₃, percent Wt.— | | | |
| Total | 23.0 | 22.2 | 24.9 |
| Combined ² | 0.68 | | |

Evaluation of Steamed ¹ Catalysts

| | | | |
| --- | --- | --- | --- |
| Conversion, Vol. percent | 54.4 | 51.6 | 51.6 |
| 10 RVP Gasoline, Vol. percent | 42.2 | 41.0 | 37.7 |
| C₅+ Gasoline, Vol. percent | 40.5 | 39.3 | 36.3 |
| Total C₄'s, Vol. percent | 15.3 | 13.8 | 16.7 |
| Dry Gas, Wt. percent | 6.0 | 5.3 | 6.1 |
| Coke, Wt. percent | 3.2 | 3.2 | 3.3 |
| Delta: ³ | | | |
| 10 RVP Gasoline, Vol. percent | +3.3 | +3.5 | +0.2 |
| XsC₄, Vol. percent | −1.6 | −2.5 | −0.7 |
| Dry Gas, Wt. percent | −1.2 | −1.4 | −0.6 |
| Coke, Wt. percent | −0.7 | −0.2 | −0.1 |

¹ Steamed 20 hours at 1225° F. with 100% steam at atmos. pressure.
² Residual Al₂O₃ after treating catalyst fines with hot 67% H₂SO₄ for 24 hours.
³ Delta difference between catalysts and standard silica alumina catalyst at the same conversion.
*Al₂(SO₄)₃·18H₂O.

From a comparison of the above tabulated results, it will be seen that the most active and selective cracking catalyst was obtained at the short hydrogel activation time, utilizing hot acid as the activating medium.

The following examples serve to show the effect of acid activating temperature, concentration and time on catalytic properties of the present catalyst.

EXAMPLE 4

The catalyst of this example was prepared in the same manner as in Example 1 except that the hydrogel was treated with the 2 weight percent aqueous sulfuric acid solution for 24 hours at room temperature (70–80° F.).

Catalytic cracking evaluation of this catalyst was carried out under the same conditions as in Example 1. The results obtained show that insufficient activation has taken place. The catalyst obtained had a 47.5 volume percent conversion, i.e., approximately 7 volume percent less than that of the catalyst of Example 1. The selectivity of this catalyst is also poorer, affording only +2.5 volume percent more gasoline than the standard silica-alumina catalyst at the same conversion.

EXAMPLE 5

The catalyst of this example was prepared in the same manner as in Example 1 except that the hydrogel was treated with a 5 weight percent aqueous sulfuric acid solution for 24 hours at room temperature (70–80° F.). The acid treated hydrogel was then water washed free of sulfate ions and dried, calcined and stabilized as in Example 1.

Catalytic cracking evaluation of this catalyst was carried out under the same conditions utilized in Example 1. The results obtained show that treatment with the higher sulfuric acid concentration at room temperature serves to increase the conversion to 50.2 volume percent but did not substantially improve the selectivity over that achieved with the catalyst of the previous example. In addition, the coke make obtained with the catalyst of the present example was +0.4 weight percent greater than that obtained with the standard silica-alumina catalyst at the same conversion.

EXAMPLE 6

The catalyst of this example was prepared in the same manner as in Example 1 except that the hydrogel was treated with a 3 weight percent aqueous sulfuric acid treatment for 5 hours at 150° F. The acid treated hydrogel was then water-washed free of sulfate ions and dried, calcined and stabilized as in Example 1.

Catalytic cracking evaluation of this catalyst was carried out under the same conditions utilized in Example 1. The results obtained show good activity, 53.8 volume percent conversion, as well as a +3.1 volume percent gasoline advantage over the standard silica-alumina catalyst. The excess $C_4$'s was −2.4 volume percent and dry gas was −1.3 weight percent in comparison to that obtained with the standard catalyst.

EXAMPLE 7

The catalyst of this example was prepared in the same manner as in Example 1 except that the hydrogel was treated with the 2 weight percent aqueous sulfuric acid solution for 4 hours at 200° F.

Catalytic cracking evaluation of this catalyst was carried out as above and the results obtained established that the catalyst was not substantially different from that of Example 1.

The results of the above Examples 4–7, together with those of Examples 1 and 2, are shown in Table II below:

*Table II*

| Example No. | 4 | 5 | 6 | 1 | 7 | 2 |
|---|---|---|---|---|---|---|
| Description | Silica gel plus 25% $Al_2O_3$ as alpha $Al_2O_3 \cdot 3H_2O$ formed at 8.5 pH | | | | | |
| Hydrogel Activation: | | | | | | |
| Solution | $H_2SO_4$ | $H_2SO_4$ | $H_2SO_4$ | $H_2SO_4$ | $H_2SO_4$ | $H_2SO_4$ |
| Conc., Percent Wt | 2 | 5 | 3 | 2 | 2 | 2 |
| Time, Hrs | 24 | 24 | 5 | 2 | 4 | 2 |
| Temp., °F | R.T. | R.T. | 150 | 200 | 200 | 200 |
| Final Gel pH | 1.9 | 1.6 | 2.2 | 3.6 | 3.1 | 3.0 |
| Base Exchange: | | | | | | |
| Solution | $NH_4Cl$ | No | No | $NH_4Cl$ | $NH_4Cl$ | No |
| Conc., Percent Wt | 2 | | | 2 | 2 | |
| No. changes | 4 | | | 4 | 4 | |
| Physical Properties: | | | | | | |
| Apparent Dens., g./cc.— | | | | | | |
| Fresh | | | | | | |
| Steamed [1] | 0.66 | | | 0.65 | 0.72 | 0.87 |
| Surface Area, m.²/g.— | | | | | | |
| Fresh | 553 | 520 | 492 | 536 | 522 | 506 |
| Steamed [1] | 244 | 207 | 189 | 203 | 191 | 175 |
| Analysis: | | | | | | |
| Na, Percent Wt | 0.09 | 0.07 | 0.16 | 0.08 | 0.05 | 0.43 |
| $SO_4$, Percent Wt | 0.09 | <0.09 | <0.09 | <0.09 | <0.09 | <0.09 |
| $Al_2O_3$, Percent Wt.— | | | | | | |
| Total | 23.8 | 19.9 | 20.5 | 23.0 | 23.0 | 22.2 |
| Combined [2] | | | | 0.68 | | |
| EVALUATION OF STEAMED [1] CATALYSTS | | | | | | |
| Conversion, Vol. Percent | 47.5 | 50.2 | 53.8 | 54.4 | 55.6 | 51.6 |
| 10 RVP Gasoline, Vol. Percent | 38.1 | 39.2 | 41.7 | 42.2 | 43.0 | 41.0 |
| $C_5$+ Gasoline, Vol. Percent | 36.4 | 37.5 | 40.2 | 40.5 | 41.4 | 39.3 |
| Total $C_4$s, Vol. Percent | 12.6 | 13.1 | 14.6 | 15.3 | 15.8 | 13.8 |
| Dry Gas, Wt. Percent | 5.2 | 5.6 | 5.8 | 6.0 | 6.2 | 5.3 |
| Coke, Wt. Percent | 2.7 | 3.7 | 3.9 | 3.2 | 3.1 | 3.2 |
| Delta: [3] | | | | | | |
| 10 RVP Gasoline, Vol. Percent | +2.5 | +2.3 | +3.1 | +3.3 | +3.6 | +3.5 |
| $XsC_4$, Vol. Percent | −2.1 | −2.6 | −2.4 | −1.6 | −2.0 | −2.5 |
| Dry Gas, Wt. Percent | −1.1 | −0.9 | −1.3 | −1.2 | −1.2 | −1.4 |
| Coke, Wt. Percent | −0.4 | +0.4 | +0.2 | −0.7 | −0.9 | −0.2 |

[1] Steamed 20 hours at 1225° F. with 100% steam at atmospheric pressure.
[2] Residual $Al_2O_3$ after treating catalyst fines with hot 67% $H_2SO_4$ for 24 hours.
[3] Delta difference between experimental catalysts and stand silica-alumina catalyst at the same conversion.

It will be seen from the foregoing data that hot acid activation for 2 to 4 hours at about 200° F. afforded a catalyst of maximum improvement. Lower temperatures and higher acid concentration show lower selectivity in gasoline advantage and in some instances the coke make is greater than the standard silica-alumina cracking catalyst.

The following example illustrates that the cracking catalyst described herein can also be activated by heat treating the hydrogel in a hot acid salt solution, such as a 5 percent by weight aqueous solution of aluminum sulfate.

EXAMPLE 8

The catalyst of this example was prepared in the same manner as in Example 1 except that, in place of treating with acid, the hydrogel was treated with 5 weight percent aqueous aluminum sulfate solution for 21 hours at 200° F. using ½ volume of such solution per volume of hydrogel. The treated hydrogel was then water washed free of sulfate ions and dried, calcined and stabilized as in Example 1. The finished catalyst had a surface area of 182 m.²/g., a sodium content of 0.21 weight percent, a sulfate content of <0.09 weight percent and an alumina content of 24.9 weight percent.

Catalytic evaluation of this catalyst, carried out as above, showed good conversion, 53.8 volume percent and a selectivity of +3.0 volume percent gasoline, −1.9 volume percent excess $C_4$'s and a −0.5 weight percent coke advantage over standard silica-alumina cracking catalyst.

The above results, together with those obtained for Example 3 are shown below:

*Table III*

| Example No. | 3 | 8 |
|---|---|---|
| Description | Silica gel plus 25% wt. Al₂O₃ as alpha Al₂O₃·3H₂O | |
| Hydrogel Activation: | | |
| Solution | (*) | (*) |
| Conc., Percent Wt | 5 | 5 |
| Time, Hrs | 4 | 21 |
| Temp., °F | 200 | 200 |
| Final Gel pH | 3.5 | 3.5 |
| Base Exchange | None | None |
| Physical Properties: | | |
| Apparent Dens., g./cc.— | | |
| Fresh | | |
| Steamed [1] | 0.77 | 0.73 |
| Surface Area, m.²/g.— | | |
| Fresh | 498 | 494 |
| Steamed [1] | 180 | 182 |
| Analysis: | | |
| Na, Percent Wt | 0.29 | 0.21 |
| SO₄, Percent Wt | <0.09 | <0.09 |
| Al₂O₃, Percent Wt.— | | |
| Total | 24.9 | 24.9 |
| Combined [2] | | 1.48 |

EVALUATION OF STEAMED [1] CATALYSTS

| | | |
|---|---|---|
| Conversion, Vol. Percent | 51.6 | 53.8 |
| 10 RVP Gasoline, Vol. Percent | 37.7 | 42.3 |
| C₅+ Gasoline, Vol. Percent | 36.3 | 40.8 |
| Total C₄'s, Vol. Percent | 16.7 | 16.0 |
| Dry Gas, Wt. Percent | 6.1 | 6.3 |
| Coke, Wt. Percent | 3.3 | 3.5 |
| Delta: [3] | | |
| 10 RVP Gasoline, Vol. Percent | +0.2 | +3.0 |
| XsC₄, Vol. Percent | −0.7 | −1.9 |
| Dry Gas, Wt. Percent | −0.6 | −1.2 |
| Coke, Wt. Percent | −0.1 | −0.5 |

[1] Steamed 20 hours at 1225° F. with 100% steam at atmospheric pressure.
[2] Residual Al₂O₃ after treating catalyst fines with hot 67% H₂SO₄ for 24 hours.
[3] Delta difference between experimental catalysts and standard silica-alumina catalyst at the same conversion.
*Al₂(SO₄)₃·18H₂O.

It will be seen from the above results that while activation with the aluminum sulfate solution at 200° F. for 21 hours afforded a highly effective catalyst, treatment for 4 hours under the same conditions was not sufficient to activate the hydrogel. Thus, it is evident that activation can be accomplished in an acid salt solution, providing that such activating treatment is of sufficient duration.

The following examples illustrate the necessity for controlling the amount of interaction between the alumina fines and acidic solution. Increased interaction between the fines and acid solution has been found to result in the formation of cogelled silica-alumina content, which, as noted hereinabove, has been found to effect a reduction in the desired catalytic selectivity. The control of cogelled alumina was achieved by introducing alumina, as aluminum sulfate, into the acid solution to add respectively 1, 2 and 3 percent by weight of alumina as a cogelled component.

EXAMPLE 9

The catalyst of this example was prepared in the same manner as in Example 1 except that to the sulfuric acid forming solution was added sufficient aluminum sulfate to contribute an additional 1 percent by weight, on the finished catalyst basis, of cogelled alumina. The resulting aluminum sulfate-sulfuric acid solution was mixed with the same silicate solution used in Example 1. The hydrogel so obtained, formed at a pH of 8.5, was found to contain 25 weight percent alumina as fines and 1 weight percent alumina is cogelled alumina resulting from the introduced aluminum sulfate. The hydrogel product obtained was thereafter acid activated and processed in a manner identical with that described in Example 1.

EXAMPLE 10

The catalyst of this example was prepared in the same manner as in Example 9 except that to the sulfuric acid forming solution was added sufficient aluminum sulfate to contribute an additional 2 percent by weight, on the finished catalyst basis, of cogelled alumina, so that the hydrogel product contained 25 weight percent alumina as fines and 2 weight percent alumina as cogelled alumina.

EXAMPLE 11

The catalyst of this example was prepared in the same manner as in Example 9 except that to the sulfuric acid forming solution was added sufficient aluminum sulfate to contribute an additional 3 percent by weight, on the finished catalyst basis, of cogelled alumina, so that the hydrogel product contained 25 weight percent alumina as fines and 3 weight percent alumina as cogelled alumina.

The results obtained upon catalytic evaluation of the catalysts of Examples 9–11 as well as for a catalyst prepared in a manner identical to that of Example 1, referred to herein as Example 1A, are shown in the table below:

*Table IV*

| Example No. | 1A | 9 | 10 | 11 |
|---|---|---|---|---|
| Description | Silica gel plus 25% Al₂O₃, as alpha Al₂O₃·3H₂O formed at 8.5 pH | | | |
| Hydrogel Activation: | | | | |
| Solution | H₂SO₄ | H₂SO₄ | H₂SO₄ | H₂SO₄ |
| Conc., Percent Wt | 2 | 2 | 2 | 2 |
| Time, Hrs | 2 | 2 | 2 | 2 |
| Temp., °F | 200 | 200 | 200 | 200 |
| Final Gel pH | 2.9/3.3 | 3.5 | 3.5 | 3.6 |
| Wt. Percent Cogelled Al₂O₃ | 0 | 1 | 2 | 3 |
| Base Exchange: | | | | |
| Solution | NH₄Cl | NH₄Cl | NH₄Cl | NH₄Cl |
| Conc., Percent Wt | 2 | 2 | 2 | 2 |
| No. Changes | 4 | 4 | 4 | 4 |
| Physical Properties: | | | | |
| Apparent Dens., g./cc.— | | | | |
| Fresh | | | | |
| Steamed [1] | 0.74 | 0.79 | 0.86 | 0.86 |
| Surface Area, m.²/g.— | | | | |
| Fresh | 488 | 464 | 483 | 415 |
| Steamed [1] | 203 | 181 | 168 | 153 |
| Analysis: | | | | |
| Na, Percent Wt | 0.12 | 0.12 | 0.07 | 0.16 |
| SO₄, Percent Wt | <0.09 | <0.09 | <0.09 | <0.09 |
| Al₂O₃, Percent Wt.— | | | | |
| Total | 22.9 | 24.3 | 24.9 | 24.4 |
| Combined [2] | 1.02 | 1.38 | 1.44 | 2.19 |

EVALUATION OF STEAMED [1] CATALYSTS

| | | | | |
|---|---|---|---|---|
| Conversion, Vol. Percent | 54.4 | 56.3 | 56.7 | 56.2 |
| 10 RVP Gasoline, Vol. Percent | 42.5 | 42.5 | 42.2 | 42.1 |
| C₅+ Gasoline, Vol. Percent | 40.4 | 41.3 | 40.8 | 40.6 |
| Total C₄'s, Vol. Percent | 16.6 | 16.5 | 16.9 | 16.3 |
| Dry Gas, Wt. Percent | 6.3 | 6.6 | 6.7 | 6.5 |
| Coke, Wt. Percent | 3.2 | 3.4 | 3.7 | 3.8 |
| Delta:[3] | | | | |
| 10 RVP Gasoline, Vol. Percent | +3.6 | +2.7 | +2.3 | +2.5 |
| XsC₄, Vol. Percent | −3.2 | −1.2 | −1.3 | −1.6 |
| Dry Gas, Wt. Percent | −0.9 | −0.9 | −0.9 | −1.0 |
| Coke, Wt. Percent | −0.6 | −0.7 | −0.4 | −0.2 |

[1] Steamed 20 hours with 100% steam at atmospheric pressure, at 1225° F.
[2] Residual Al₂O₃ after treating catalyst fines with hot 67% H₂SO₄ for 24 hours.
[3] Delta difference between experimented catalysts and standard silica-alumina catalyst at the same conversion.

It is evident from the foregoing data that the added alumina, as cogelled component, which would result from excessive alumina fines-acid interaction increases conversion. However, the added alumina as cogelled alumina shows reduced selectivity advantage over standard silica-alumina catalyst. Gasoline selectivities of +2.3 to +2.7 volume percent compared to +3.6 volume percent for the catalyst containing no additional cogelled alumina were realized. Economically a 1 percent loss in gasoline yield is very important. These data show that the presence of cogelled alumina in the catalyst described herein is detrimental and should be controlled to less than about 1.5 percent by weight in order to achieve the maximum selectivity advantage.

The following examples illustrate the effect of added cogelled alumina on catalytic properties of catalyst activated with hot aqueous aluminum sulfate solution.

EXAMPLE 12

The catalyst of this example was prepared in the same manner as in Example 9 except that the hydrogel product, instead of being treated with sulfuric acid activating solution, was treated with a 5 percent by weight aqueous solution of aluminum sulfate for 20 hours at 200° F. After such treatment, the hydrogel product was washed, dried, calcined and steam treated as described in Example 1.

EXAMPLE 13

The catalyst of this example was prepared in the same manner as in Example 10 except that the hydrogel product, instead of being treated with sulfuric acid activating solution, was treated with aluminum sulfate solution and processed as in the preceding example.

EXAMPLE 14

The catalyst of this example was prepared in the same manner as in Example 11 except that the hydrogel product, instead of being treated with sulfuric acid activating solution, was treated with aluminum sulfate solution and processed as in Example 12.

The results obtained upon catalytic evaluation of the catalysts of Examples 12–14, as well as for the catalyst of Example 8, are shown in the table below:

Table V

| Example No. | 8 | 12 | 13 | 14 |
|---|---|---|---|---|
| Description | \multicolumn{4}{c}{Silica gel plus 25% Al$_2$O$_3$ as alpha Al$_2$O$_3$·3H$_2$O formed at 8.5 pH} | | | |
| Hydrogel Activation: | | | | |
| Solution | (*) | (*) | (*) | (*) |
| Conc., Percent Wt | 5 | 5 | 5 | 5 |
| Time, Hrs | 20 | 20 | 20 | 20 |
| Temp., °F | 200 | 200 | 200 | 200 |
| Final Gel pH | 3.5 | 3.5 | 3.6 | 3.7 |
| Wt. Percent Cogelled Al$_2$O$_3$ | 0 | 1 | 2 | 3 |
| Base Exchange: | | | | |
| Solution | NH$_4$Cl | NH$_4$Cl | NH$_4$Cl | NG$_4$Cl |
| Conc., Percent Wt | 2 | 2 | 2 | 2 |
| No. Changes | 4 | 4 | 4 | 4 |
| Physical Properties: | | | | |
| Apparent Dens., g./cc.— | | | | |
| Fresh | | | | |
| Steamed [1] | 0.73 | 0.77 | 0.77 | 0.81 |
| Surface Area, m.$^2$/g.— | | | | |
| Fresh | 494 | 449 | 503 | 501 |
| Steamed [1] | 182 | 191 | 192 | 188 |
| Analysis: | | | | |
| Na, Percent Wt | 0.21 | 0.15 | 0.05 | 0.08 |
| SO$_4$, Percent Wt | <0.09 | <0.09 | <0.09 | <0.09 |
| Al$_2$O$_3$, Percent Wt.— | | | | |
| Total | 24.9 | 29.0 | 26.8 | 27.0 |
| Combined [2] | 1.48 | 1.73 | | |

EVALUATION OF STEAMED [1] CATALYSTS

| | | | | |
|---|---|---|---|---|
| Conversion, Vol. Percent | 55.8 | 58.4 | 53.8 | 58.5 |
| 10 RVP Gasoline, Vol. Percent | 42.3 | 42.3 | 38.8 | 42.5 |
| C$_5$+ Gasoline, Vol. Percent | 40.8 | 41.0 | 36.9 | 41.3 |
| Total C$_4$'s, Vol. Percent | 16.0 | 18.3 | 17.1 | 18.5 |
| Dry Gas, Wt. Percent | 6.3 | 7.1 | 7.2 | 6.6 |
| Coke, Wt. Percent | 3.5 | 3.9 | 4.0 | 4.1 |
| Delta:[3] | | | | |
| 10 RVP Gasoline, Vol. Percent | +3.0 | +1.8 | −0.7 | +1.6 |
| XsC$_4$, Vol. Percent | −1.9 | −0.3 | +0.5 | −0.3 |
| Dry Gas, Wt. Percent | −1.2 | −0.8 | +0.1 | −1.2 |
| Coke, Wt. Percent | −0.5 | −0.5 | +0.3 | −0.4 |

[1] Steamed 20 hours with 100% steam at atmospheric pressure, at 1225°F.
[2] Residual Al$_2$O$_3$ after treating catalyst fines with hot 67% H$_2$SO$_4$ for 24 hours.
[3] Delta difference between experimented catalysts and standard silica-alumina catalyst at the same conversion.
*Al$_2$(SO$_4$)$_3$·18H$_2$O It will be seen from the above data that a cogelled alumina content of above 1.5 weight percent was definitely detrimental to the desired selectivity advantage over the standard silica-alumina catalyst.

The following examples illustrate the effect of alumina fines content on the catalytic characteristics of the resulting catalyst. In addition, a comparison is also made in this study of the effect of cogelled alumina arising from the solution of alumina fines during an extended fines-acid contact period of 2 hours instead of the usual 0–½ hour period involved in forming the bead catalyst.

EXAMPLE 15

The catalyst of this example was prepared by dispersing 12.5 percent by weight Al$_2$O$_3$, on the ultimate catalyst basis, as alpha alumina trihydrate milled fines in the acid solution used to form silica gel by reaction with the silicate solution. The fines in this example were milled 72 hours in a 20 percent by weight aqueous alumina slurry. The resulting slurry contained finely divided alumina having a weight mean particle diameter of 1.46 microns. A quantity of such slurry was dispersed in a solution of sulfuric acid as follows.

A. Acid-alumina fines solution:

(1) 4.76 lbs. of 96% H$_2$SO$_4$
    22.10 lbs. of H$_2$O
(2) 9.49 lbs. aqueous slurry α Al$_2$O$_3$·3H$_2$O containing 20% wt. Al$_2$O$_3$
    22.1 lbs. of H$_2$O Solution 2 was added slowly to Solution 1 while agitating vigorously to prevent agglomeration of the fines. The final solution A had a specific gravity of 1.084 at 77° F.

Solution A above was immediately mixed with an aqueous sodium silicate solution, having a specific gravity of 1.206 at 81° F. and characterized by the following composition.

B. Silicate solution:
   33 lbs. of N-Brand sodium silicate
   22 lbs. of H$_2$O Four hundred sixteen (416) cc./min. of the acid-fines solution were contacted with 402 cc./min. of the silicate solution in a mixing nozzle, forming a hydrosol having a pH of 8.4. The resulting hydrosol was introduced in the form of globules into a water immisible oil medium wherein the globules set to hydrogel beads in 1.9 seconds at a hydrosol temperature of 58° F.

After formation, the hydrogel beads were water rinsed free of oil and covered with a 2 weight percent aqueous sulfuric acid solution (½ volume of acid solution/volume hydrogel). The hydrogel was then heat treated in the acid solution at 200° F. for 2 hours, reducing the hydrogel pH from 8.4 to 3.0. The acid-treated hydrogel was then base-exchanged employing three 2-hour and one overnight (20 hours) treating periods with 2 percent by weight aqueous ammonium chloride solution. The base-exchanged product was water washed free of chloride and sulfate ions, air dried at 275° F. for 20 hours in air, calcined in air for 10 hours at 1000° F. and steam treated 20 hours at 1225° F. in 100 percent atmospheric steam.

EXAMPLE 16

The catalyst of this example was prepared in the same manner as in Example 15 except that the alumina fines were contacted for 2 hours at room temperature (70–80° F.) with the sulfuric acid solution before admixing with the silicate solution. The resulting hydrogel was then processed as in Example 15.

EXAMPLE 17

The catalyst of this example was prepared in the same manner as in Example 15 except that the hydrogel, instead of being treated with an acid, was heat treated in a 5 weight percent aqueous solution of aluminum sulfate for 24 hours at 200° F. The treated hydrogel was thereafter base-exchanged and processed as in Example 15.

The results obtained upon catalytic evaluation of the catalysts of Examples 15–17, as well as for the catalyst of Examples 1A and 8, are shown in the table below:

Table VI

| Example No. | 1A | 15 | 4 16 | 8 | 17 |
| --- | --- | --- | --- | --- | --- |
| Description, percent Wt. $Al_2O_3$ fines | 25 | 12.5 | 12.5 | 25 | 12.5 |
| Hydrogel Activation: | | | | | |
| Solution | $H_2SO_4$ | $H_2SO_4$ | $H_2SO_4$ | (*) | (*) |
| Conc., percent Wt. | 2 | 2 | 2 | 5 | 5 |
| Time, Hrs | 2 | 2 | 2 | 20 | 24 |
| Temp., ° F | 200 | 200 | 200 | 200 | 200 |
| Final Gel pH | 2.9/3.3 | 3.0 | 3.0 | 3.5 | 3.0 |
| Base Exchange: | | | | | |
| Solution | $NH_4Cl$ | $NH_4Cl$ | $NH_4Cl$ | None | $NH_4Cl$ |
| Conc., Wt. percent | 2 | 2 | 2 | | 2 |
| No. Changes | 4 | 4 | 4 | | 4 |
| Physical Properties: | | | | | |
| Apparent Dens., g/cc.— | | | | | |
| Fresh | | | | | |
| Steamed 1 | 0.74 | 0.82 | 0.91 | 0.73 | 0.64 |
| Surface Area, $m^2/g$.— | | | | | |
| Fresh | 488 | 505 | 454 | 494 | 518 |
| Steamed 1 | 203 | 181 | 164 | 182 | 209 |
| Analysis: | | | | | |
| NA, percent Wt. | 0.12 | 0.11 | 0.14 | 0.21 | 0.13 |
| $SO_4$, percent Wt. | <0.09 | <0.09 | <0.09 | <0.09 | <0.09 |
| $Al_2O_3$, percent Wt.— | | | | | |
| Total | 22.9 | 14.1 | 13.5 | 24.9 | 15.2 |
| Combined 2 | 1.02 | 0.93 | 1.32 | 1.48 | 1.30 |

EVALUATION OF STEAMED 1 CATALYSTS

| | | | | | |
| --- | --- | --- | --- | --- | --- |
| Conversion, Vol. percent | 54.4 | 51.8 | 50.5 | 53.8 | 52.6 |
| 10 RVP Gasoline, Vol. percent | 42.5 | 41.0 | 39.2 | 42.3 | 41.9 |
| $C_5$+Gasoline, Vol. percent | 40.4 | 39.3 | 37.6 | 40.8 | 40.1 |
| Total $C_4$'s, Vol. percent | 16.6 | 13.6 | 13.3 | 16.0 | 14.0 |
| Dry Gas, Wt. percent | 6.3 | 5.7 | 5.7 | 6.3 | 5.8 |
| Coke, Wt. percent | 3.2 | 3.2 | 3.7 | 3.5 | 2.6 |
| Delta:3 | | | | | |
| 10 RVP Gasoline, Vol. percent | +3.6 | +3.3 | +2.2 | +3.0 | +3.8 |
| $XsC_4$, Vol. percent | −3.2 | −2.9 | −2.5 | −1.9 | −2.8 |
| Dry Gas, Wt. percent | −0.9 | −1.1 | −0.9 | −1.2 | −1.1 |
| Coke, Wt. percent | −0.6 | −0.3 | −0.4 | −0.5 | −1.0 |

1 Steamed 20 hours with 100% steam at atmospheric pressure, at 1225°F.
2 Residual $Al_2O_3$ after treating catalyst fines with hot 67% $H_2SO_4$ for 24 hours.
3 Delta difference between experimental catalysts and standard silica-alumina catalyst at the same conversion.
4 Fines-acid contact 2 hours at room temperature.
*$Al_2(SO_4)_3 \cdot 18H_2O$.

It will be seen from the foregoing data that the catalyst of Example 15 was characterized by a catalytic activity and selectivity quite similar to that of Example 1A, even though the catalyst of Example 15 contains only 12.5 weight percent $Al_2O_3$ as fines whereas the catalyst of Example 1A contained 25 weight percent $Al_2O_3$ as fines. Catalytic evaluation of the catalyst of Example 16 shows the disadvantage of the added cogelled alumina component arising from the fines-acid solution during the extended fines-acid contact of 2 hours at room temperature. Conversion, utilizing this catalyst, was about 1% lower than for the catalyst of Example 15 and the selectivity was about 1% less gasoline advantage over the standard silica-alumina catalyst. The data of Table VI also show from a comparison of the evaluation results obtained with the catalysts of Examples 8 and 17 activated by treatment with hot aluminum sulfate solution that the lower alumina content catalyst, i.e., Example 17, was superior in gasoline advantage, dry gas and coke over the catalyst of Example 8 activated in a similar manner but containing 25 weight percent $Al_2O_3$ fines.

The following examples, summarized in Table VII hereinbelow, illustrate that active and selective cracking catalysts are capable of preparation in accordance with the method of the invention utilizing sources of alumina other than alpha alumina trihydrate described above.

EXAMPLE 18

The catalyst of this example was prepared in the same manner as in Example 1 except that the fines used were gamma alumina, known commercially as Alcoa F–10 alumina.

Catalytic evaluation of this catalyst showed a good conversion, 51.6 volume percent and a good selectivity advantage, +3.2 volume percent gasoline, −3.9 volume percent excess $C_4$'s and −0.9 weight percent dry gas over the standard silica-alumina catalyst.

EXAMPLE 19

The catalyst of this example was prepared in the same manner as in Example 1 except that the alumina source was raw Georgia kaolin clay. The resulting catalyst showed a gasoline advantage of +2.4 volume percent over the standard silica-alumina catalyst.

EXAMPLE 20

The catalyst of this example was prepared in the same manner as that of Example 19 except that instead of activation of the hydrogel by treatment with sulfuric acid, activation was effected by treating with a 5 percent by weight aqueous aluminum sulfate solution at 200° F. for 20 hours. The catalyst obtained showed a gasoline advantage of +3.0 volume percent over the standard silica-alumina catalyst.

EXAMPLE 21

The catalyst of this example was prepared in the same manner as in Example 1 except that the alumina source was a calcined (16 hours at 1400° F.) Georgia kaolin clay. The resulting catalyst showed a gasoline advantage of +2.9 volume percent over the standard silica-alumina catalyst.

EXAMPLE 22

The catalyst of this example was prepared in the same manner as that of Example 21 except that instead of activation of the hydrogel by treatment with sulfuric acid, activation was effected by treating with a 5 percent by weight aqueous aluminum sulfate solution at 200° F. for 20 hours. This catalyst also showed a definite improvement in gasoline yield over the standard silica-alumina catalyst.

EXAMPLE 23

The catalyst of this example was prepared in the same manner as that of Example 21 except that the clay fines and sulfuric acid solution were contacted for two hours before admixture with the silicate solution to form the bead hydrogel. Since the calcined clay is relatively slowly soluble in acid, a moderately long contact time with the acid is satisfactory. The resulting catalyst showed a marked gasoline advantage of +3.3 volume percent over the standard silica-alumina catalyst.

The results obtained utilizing the catalysts of Examples 18-23 are summarized in Table VII below:

Table VII

| Example No. | 18 | 19 | 20 | 21 | 22 | 23 |
|---|---|---|---|---|---|---|
| Description | Silica gel + 25% $Al_2O_3$ F-10 | Silica gel + 25% Clay—Raw Georgia Clay | | Silica gel + 25% clay [4]—Calcined Georgia Clay | | |
| Hydrogel Activation: | | | | | | |
| Solution | $H_2SO_4$ | $H_2SO_4$ | (*) | $H_2SO_4$ | (*) | $H_2SO_4$ |
| Conc., Percent Wt | 2 | 2 | 5 | 2 | 5 | 2 |
| Time, Hrs | 2 | 4 | 20 | 4 | 20 | 2 |
| Temp., °F | 200 | 200 | 200 | 200 | 200 | 200 |
| Final Gel pH | 2.4 | 2.6 | 3.2 | 3.6 | 3.8 | 3.5 |
| Base Exchange: | | | | | | |
| Solution | $NH_4Cl$ | $NH_4Cl$ | $NH_4Cl$ | $NH_4Cl$ | $NH_4Cl$ | $NH_4Cl$ |
| Conc., Percent Wt | 2 | 2 | 2 | 2 | 2 | 2 |
| No. Changes | 4 | 4 | 4 | 4 | 4 | 4 |
| Physical Properties: | | | | | | |
| Apparent Dens., g./cc.— | | | | | | |
| Fresh | 0.76 | | | | | |
| Steamed [1] | 0.81 | 0.90 | 0.71 | 0.77 | 0.63 | 0.75 |
| Surface Area, m.²/g.— | | | | | | |
| Fresh | | 485 | 486 | 385 | 465 | 342 |
| Steamed [1] | 205 | 165 | | | 177 | 155 |
| Analysis: | | | | | | |
| Na, Percent Wt | 0.03 | | | 0.08 | 0.08 | 0.06 |
| $SO_4$, Percent Wt | | | | <0.09 | <0.09 | <0.09 |
| $Al_2O_3$, Percent Wt.— | | | | | | |
| Total | | 10.5 | 12.1 | 10 | 12.8 | 10.3 |
| Combined [2] | 0.72 | 0.32 | 0.45 | | | |

EVALUATION OF STEAMED [1] CATALYSTS

| | | | | | | |
|---|---|---|---|---|---|---|
| Conversion, Vol. Percent | 51.6 | 37.6 | 48.5 | 47.9 | 52.4 | 48.9 |
| 10 RVP Gasoline, Vol. Percent | 40.7 | 32.2 | 39.0 | 38.6 | 40.0 | 39.5 |
| $C_5+$ Gasoline, Vol. Percent | 38.6 | 30.4 | 37.3 | 36.8 | 38.6 | 37.8 |
| Total $C_4$'s, Vol. Percent | 12.8 | 8.0 | 13.0 | 12.6 | 15.5 | 12.9 |
| Dry Gas, Wt. Percent | 5.8 | 3.8 | 5.3 | 5.3 | 6.1 | 5.3 |
| Coke, Wt. Percent | 3.4 | 2.3 | 2.4 | 2.4 | 2.7 | 2.5 |
| Delta:[3] | | | | | | |
| Gasoline, Vol. Percent | +3.2 | +2.4 | +3.0 | +2.9 | +2.0 | +3.3 |
| $XsC_4$, Vol. Percent | −3.9 | −2.4 | −2.1 | −2.4 | −0.8 | −1.6 |
| Dry Gas, Wt. Percent | −0.9 | −0.4 | −0.9 | −0.8 | −0.7 | −1.0 |
| Coke, Wt. Percent | +0.1 | +0.5 | −0.6 | −0.6 | −0.7 | −0.6 |

[1] Steamed 20 hours at 1225° F. with 100% steam at atmospheric pressure.
[2] Residual $Al_2O_3$ after treating catalyst fines with hot 67% $H_2SO_4$ for 24 hours.
[3] Delta difference between experimental catalyst and standard silica-alumina catalyst at the same conversion.
[4] Fines-acid contact. 2 hours at room temperature.
*$Al_2(SO_4)_3 \cdot 18H_2O$.

It will be seen from the above data that various sources for the alumina component of the present catalyst may be employed.

Another criterion applied to these preparations showing that the catalytic alumina should be controlled is summarized in FIGURE 1. Here a number of catalysts prepared by the method described herein were subjected to a $H_2SO_4$ extraction test to determine the amount of combined alumina as silica-alumina. From the data shown graphically in FIGURE 1, it will be seen that the least selective catalyst is one containing the most catalytic non-soluble silica-alumina (2.99 weight percent $Al_2O_3$). This catalyst was a standard (conventional) silica-alumina made by cogelling 6.3 percent $Al_2O_3$ and adding by base exchange about 3 percent $Al_2O_3$ during processing. These data shown that the combined alumina content should be kept to less than about 1.5 weight percent and preferably within the approximate range of 0.5 to 1.5 weight percent to obtain the maximum selectivity advantage.

We claim:

1. A method for preparing a catalyst consisting of silica and alumina which comprises dispersing in a silica sol an amount corresponding to between about 5 and about 40 percent by weight of the resulting dry composite of a finely divided porous material characterized by a surface area of at least 25 square meters per gram selected from the group consisting of (1) alumina and (2) composites of silica and alumina containing at least 40 weight percent alumina, which material has a weight mean particle diameter of between 1 and 5 microns, the concentrations and proportions of reactants being such that the resulting silica sol having said finely divided material dispersed therein has a pH of between 6 and 11 and an alumina content corresponding to cogelled alumina of less than about 1.5 weight percent, permitting the resulting sol to set to a hydrogel, treating the resulting hydrogel at a temperature between about 150° F. and about 220° F. with a dilute aqueous solution of a compound selected from the group consisting of acids and acid salts for a period within the approximate range of ½ to 24 hours when an acid solution is employed, and for a period within the approximate range of 8 to 48 hours when an acid salt is employed, washing the hydrogel free of water-soluble matter, drying and calcining.

2. A method for preparing a catalyst consisting essentially of silica and alumina which comprises dispersing in a silica sol, prepared by intimately contacting an aqueous acid solution and an aqueous alkali metal silicate solution, an amount corresponding to between about 5 and about 40 percent by weight of the resulting dry composite of a finely divided porous material selected from the group consisting of (1) alumina and (2) composites of silica and alumina containing at least 40 weight percent alumina, which material has a weight mean particle diameter of between 1 and 5 microns, the concentrations and proportions of reactants being such that the resulting silica sol having said finely divided material dispersed therein has a pH of between 7 and 9.5 and an alumina content corresponding to cogelled alumina of less than about 1.5 weight percent, permitting the resulting sol to set to a hydrogel, treating the resulting hydrogel at a temperature between about 150° F. and about 220° F. with a dilute aqueous solution of a compound selected from the group consisting of acids and acid salts for a period within the approximate range of ½ to 24 hours when an acid solution is employed, and for a period within the approximate range of 8 to 48 hours when an acid salt is employed, washing the hydrogel free of water-soluble matter, drying and calcining.

3. A method for preparing a catalyst consisting essentially of silica and alumina which comprises dispersing in a silica sol, an amount corresponding to between about 5 and about 40 percent by weight of the resulting dry composite of finely divided porous alumina having a surface area of at least 25 square meters per gram and a weight mean particle diameter of between 1 and 5 microns, the concentrations and proportions of reactants being such that the resulting silica sol having said finely divided alumina dispersed therein has a pH of between 6 and 11 and an alumina content corresponding to cogelled alumina of less than about 1.5 weight percent, permitting the resulting sol to set to a hydrogel, treating the resulting hydrogel at a temperature between about 150° F. and about 220° F. with a dilute aqueous acid solution for a period within the approximate range of ½ to 24 hours, washing the hydrogel free of water-soluble matter, drying and calcining.

4. A method for preparing a catalyst consisting essentially of silica and alumina which comprises dispersing in a silica sol, an amount corresponding to between about 5 and about 40 percent by weight of the resulting dry composite of a finely divided clay having a weight mean particle diameter of between 1 and 5 microns, characterized by a surface area of at least 25 square meters per gram and containing at least 40 weight percent alumina, the concentrations and proportions of reactants being such that the resulting silica sol having said finely divided clay dispersed therein has a pH of between 6 and 11 and an alumina content corresponding to cogelled alumina of less than about 1.5 weight percent, permitting the resulting sol to set to a hydrogel, treating the resulting hydrogel at a temperature between about 150° F. and about 220° F. with a dilute aqueous solution of a compound selected from the group consisting of acids and acid salts for a period within the approximate range of ½ to 24 hours when an acid solution is employed, and for a period within the approximate range of 8 to 48 hours when an acid salt is employed, washing the hydrogel free of water-soluble matter, drying and calcining.

5. A method for preparing spheroidal particles of a catalyst consisting essentially of silica and alumina which comprises dispersing in a silica sol an amount corresponding to between about 5 and about 40 percent by weight of the resulting dry composite of a finely divided porous material characterized by a surface area of at least 25 square meters per gram selected from the group consisting of (1) alumina and (2) composites of silica and alumina containing at least 40 weight percent alumina which material has a weight mean particle diameter of between 1 and 5 microns, the concentrations and proportions of reactants being such that the resulting silica sol having said finely divided material dispersed therein has a pH of between 6 and 11 and an alumina content, corresponding to cogelled alumina of less than about 1.5 weight percent, introducing globules of the resulting hydrosol into a column of water-immiscible liquid wherein the globules of hydrosol set to spheroidal hydrogel, effecting gelation of said spheroidal hydrosol particles, treating the resulting hydrogel particles at a temperature between about 150° F. and about 220° F. with a dilute aqueous solution of a compound selected from the group consisting of acids and acid salts for a period within the approximate range of ½ to 24 hours when an acid solution is employed and for a period within the approximate range of 8 to 48 hours when an acid salt is employed, washing the spheroidal hydrogel particles free of water-soluble matter, drying and calcining.

6. A catalyst composition consisting essentially of silica and alumina wherein the content of alumina attributable to alumina cogelled with silica is less than about 1.5 weight percent prepared by dispersing in a silica sol an amount corresponding to between about 5 and about 40 percent by weight of the resulting dry composite of a finely divided porous material characterized by a surface area of at least 25 square meters per gram selected from the group consisting of (1) alumina and (2) composites of silica and alumina containing at least 40 weight percent alumina, which material has a weight mean particle diameter of between 1 and 5 microns, the concentrations and proportions of reactants being such that the resulting silica sol having said finely divided material dispersed therein has a pH of between 6 and 11, permitting the resulting sol to set to a hydrogel, treating the resulting hydrogel at a temperature between about 150° F. and about 220° F. with a dilute aqueous solution of a compound selected from the group consisting of acids and acid salts for a period within the approximate range of ½ to 24 hours when an acid solution is employed and for a period of 8 to 48 hours when an acid salt is employed, washing the hydrogel free of water-soluble matter, drying and calcining.

7. A catalyst composition in the form of spheroids consisting essentially of silica and alumina wherein the alumina content attributable to alumina cogelled with silica is less than about 1.5 weight percent, prepared by dispersing in a silica sol, an amount corresponding to between about 5 and about 40 percent by weight of the resulting dry composite of a finely divided porous material characterized by a surface area of at least 25 square meters per gram selected from the group consisting of (1) alumina and (2) composites of silica and alumina containing at least 40 weight percent alumina, which material has a weight mean particle diameter of between 1 and 5 microns, the concentrations and proportions of reactants being such that the resulting silica sol having said finely divided material dispersed therein has a pH of between 6 and 11, introducing globules of the resulting hydrosol in a column of water-immiscible liquid wherein the globules of hydrosol set to spheroidal hydrogel, effecting gelation of said spheroidal hydrosol particles, treating the resulting hydrosol particles at a temperature between about 150° F. and about 220° F. with a dilute aqueous solution of a compound selected from the group consisting of acids and acid salts for a period in the approximate range of ½ to 24 hours when an acid solution is employed, and for a period within the approximate range of 8 to 48 hours when an acid salt is employed, washing the spheroidal hydrosol particles free of water-soluble matter, drying and calcining.

8. A method for preparing a catalyst consisting essentially of silica and alumina which comprises dispersing in a silica sol an amount corresponding to between about 5 and about 40 percent by weight of the resulting dry composite of a finely divided porous material characterized by a surface area of at least 25 square meters per gram selected from the group consisting of (1) alumina and (2) composites of silica and alumina containing at least 40 weight percent alumina, which material has a weight mean particle diameter of between 1 and 5 microns, the concentrations and proportions of reactants being such that the resulting silica sol having said finely divided material dispersed therein has a pH of between 6 and 11 and an alumina content corresponding to cogelled alumina of less than about 1.5 weight percent, permitting the resulting sol to set to a hydrogel, treating the resulting hydrogel at a temperature between about 150° F. and about 220° F. with a dilute aqueous aluminum acid salt solution for a period within the approximate range of 8 to 48 hours, washing the hydrogel free of water soluble matter, drying and calcining the resulting hydrogel.

References Cited in the file of this patent

UNITED STATES PATENTS

| | | |
|---|---|---|
| 2,487,065 | Milliken | Nov. 8, 1949 |
| 2,631,983 | Milliken | Mar. 17, 1953 |
| 2,669,547 | Shabaker | Feb. 6, 1954 |
| 2,941,958 | Connor et al. | June 21, 1960 |
| 2,964,481 | Cramer et al. | Dec. 13, 1960 |

UNITED STATES PATENT OFFICE
CERTIFICATE OF CORRECTION

Patent No. 3,120,496                          February 4, 1964

Charles J. Plank et al.

It is hereby certified that error appears in the above numbered patent requiring correction and that the said Letters Patent should read as corrected below.

Column 4, line 58, after "alumina,", first occurrence, insert -- eta alumina, --; column 11, line 74, for "is" read -- as --; column 13, Table V, under the heading "14", line 9 thereof, for "NG$_4$Cl" read -- NH$_4$Cl --; column 14, line 50, for "immisible" read -- immiscible --.

Signed and sealed this 8th day of December 1964.

(SEAL)
Attest:

ERNEST W. SWIDER                            EDWARD J. BRENNER
Attesting Officer                                  Commissioner of Patents